H. STRAIT.
Potato-Diggers.

No. 146,148.

Patented Jan. 6, 1874.

Attest:
Ezra R. Nail
G. T. Nichols

Inventor:
Hiram Strait

UNITED STATES PATENT OFFICE.

HIRAM STRAIT, OF TROY, NEW YORK.

IMPROVEMENT IN POTATO-DIGGERS.

Specification forming part of Letters Patent No. 146,148, dated January 6, 1874; application filed October 2, 1873.

*To all whom it may concern:*

Be it known that I, HIRAM STRAIT, of Troy, Rensselaer county, and State of New York, have invented certain Improvements in Potato-Diggers, of which the following is a specification:

This potato-digger consists of the following parts: The double mold-board plow P, the beam B, the clearer C C, clearing-teeth T T, and handles H H.

Figure 1:
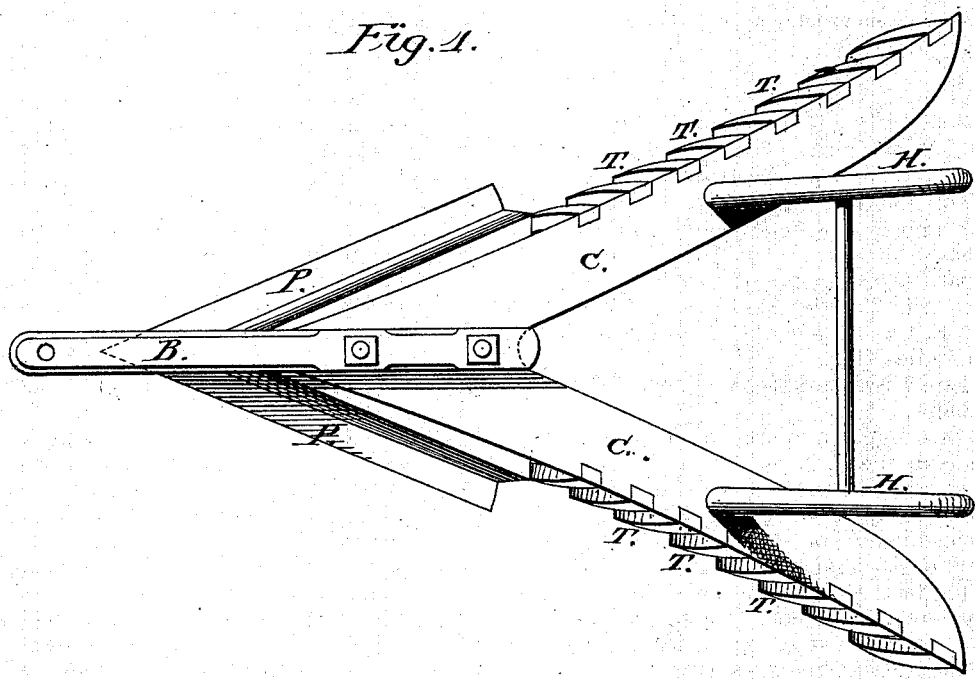
Figure 2:
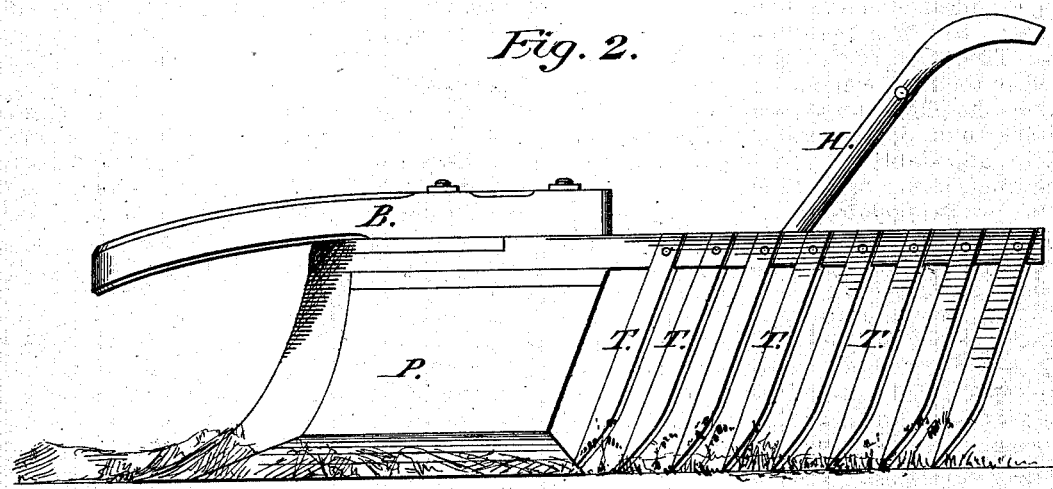

Figure 1 is a perspective view, and Fig. 2 a side view.

In this digger a double mold-board plow, P, or its equivalent, is used to split or divide the hills or rows in the middle vertically, and to lift or turn up each furrow more or less toward a perpendicular, or so as to incline and press continuously against the mold-boards and clearing-teeth. If the furrows are turned entirely over, it only complicates the separation of the potatoes from the vines and the soil, and the clearer requires greater length and width. The shares of this plow are to extend far enough outward horizontally to cut nearly through the hills or rows to the proper depth, so as to facilitate the passage of the clearing-teeth in the ground. This plow is made flat on top for the handier attachment of the clearer and beam, and their easier adjustment to the draft. The arms of the clearer may be attached to the plow combined, or the beam directly to the plow, and an arm on each side of it either to it or the beam. They may be fixed or adjustable. The power is attached to the front of the beam B, and the depth of the furrows is regulated by either a set-screw in front of each of the bolts, by the shifting of washers from one bolt to the other, or by shifting a suitable wedge from the front of one bolt to the other, between either the plow and clearer or beam and plow, and then the tightening of the bolts in connection with the clevis adjustment. The handles H H can be attached either to the arms c c or to the rear of the beam, and are used to pull the digger backward or lift up either arm when necessary. The clearer consists of two diverging arms, c c, in V form, either separate or attached in front to one another and to the top of the plow. They may be straight or curved, and of any desired length, and of a fixed or adjustable width. To these arms, in rear of the plow, the clearing-teeth are to be attached, so as to incline or point more or less forward and outward, so as to rub constantly against the inside of the furrows, and detach and separate the potatoes and soil from the roots of the vines. They are to spread, level, and clear away the furrows, and to keep all the roots, vines, weeds, sods, &c., on the outside. These teeth are to be about three inches apart, or with spaces between them wide or large enough to allow all the potatoes to pass freely inward with the loosened soil, and yet keep all the vines, &c., on the outside. These teeth may be variously flanged, ribbed, or toothed on the outside, to better detach the potatoes and break up the furrows, may be variously curved or shaped, or be straight, and may terminate in various kinds of points to loosen and spread the soil most speedily. By attaching adjustable shields to the arms, the tooth-spaces may be more or less shortened to retard, and lengthened to increase, the inward flow of dirt through them. The teeth may be variously strengthened crosswise by bands, rods, or light shares so disposed and secured as not to impair their efficiency.

The clearing-teeth are to act as sifting, spreading, and separating mold-boards to the furrows, and should conform more or less to the plow used. The digging of the potatoes, and their separation and that of the soil from the roots of the vines, are to be effected mainly on the inside or under side of the furrows by the clearing-teeth, by always keeping them working in the ground instead of on it, to prevent their outside entanglement. Just in rear of the plow the clearer may be cut apart crosswise and then hinged together again, to allow it more freedom and to be turned up when turning round or likely to strike anything in its way.

The clearing-teeth may be made of wood, malleable, wrought, or cast iron, or steel, and the arms of the clearer of wood, or wrought or cast iron. The teeth may be variously secured to the arms, so as to attach, detach, or adjust, as occasion may require.

I claim—

The combination of the triangular frame c, inclined teeth T, and double mold-board and point P, as and for the purpose specified.

HIRAM STRAIT. - [L. S.]

Witnesses:
 EZRA R. VAIL,
 G. F. NICHOLS.